US006651608B2

(12) United States Patent
Steffen

(10) Patent No.: US 6,651,608 B2
(45) Date of Patent: Nov. 25, 2003

(54) MANUALLY OPERATED WORKING DEVICE HAVING A SPEED THAT IS ADJUSTED AUTOMATICALLY

(75) Inventor: Michael Steffen, Stockdorf (DE)

(73) Assignee: Wacker Construction Equipment AG, Munich (DE)

(*) Notice: Subject to any disclaimer, the term of this patent is extended or adjusted under 35 U.S.C. 154(b) by 0 days.

(21) Appl. No.: 10/182,032

(22) PCT Filed: Jan. 13, 2001

(86) PCT No.: PCT/EP01/00712

§ 371 (c)(1),
(2), (4) Date: Jul. 19, 2002

(87) PCT Pub. No.: WO01/55510

PCT Pub. Date: Aug. 2, 2001

(65) Prior Publication Data

US 2002/0189219 A1 Dec. 19, 2002

(30) Foreign Application Priority Data

Jan. 27, 2000 (DE) ........................................ 100 03 486

(51) Int. Cl.[7] ................................................ A01D 34/03
(52) U.S. Cl. ................................................... 123/198 D
(58) Field of Search ...................................... 123/198 D

(56) References Cited

U.S. PATENT DOCUMENTS 4,156,575 A 5/1979 König et al.
4,223,950 A * 9/1980 Barr ............................ 299/54
4,336,778 A * 6/1982 Howard ....................... 123/334
4,792,052 A * 12/1988 Okuda et al. ............... 212/287
5,033,428 A * 7/1991 Sasaki .................... 123/198 D
5,917,165 A 6/1999 Platt et al.
6,474,300 B1 * 11/2002 Steffen ....................... 123/377

FOREIGN PATENT DOCUMENTS

| | | |
|---|---|---|
| DE | 4344187 | 6/1995 |
| DE | 19834443 | 2/2000 |
| EP | 0 701 917 | 3/1996 |
| FR | 2496172 | 6/1982 |
| WO | WO 9618067 | 6/1996 |

* cited by examiner

*Primary Examiner*—Willis R. Wolfe
*Assistant Examiner*—Douglas A. Salser
(74) *Attorney, Agent, or Firm*—Boyle Fredrickson Newholm Stein & Gratz S.C.

(57) ABSTRACT

The invention relates to a motor-driven operating device that comprises a guide handle. Two sensor elements are provided on the guide handle and in two handle areas for detecting the hands of an operator. An ignition device of the motor is controlled by means of a security control device in such a way that the speed can only be increased beyond a security speed when the guide handle is held with both hands, whereby said security control device evaluates the sensor signals. The motor speed is limited to the security speed when the two sensor signals are missing.

10 Claims, 2 Drawing Sheets

MANUALLY OPERATED WORKING DEVICE HAVING A SPEED THAT IS ADJUSTED AUTOMATICALLY

BACKGROUND OF THE INVENTION

1. Field of the Invention

The invention relates to a hand-guided implement.

2. Description of the Related Art

Such an implement, such as, for example, a vibratory tamper for soil compaction or an impact hammer, has a gasoline engine, but occasionally also a diesel engine or an electric motor, for the drive. Provided no electric starter is provided, the engine is normally started by actuating the pulling cable of a reversing starter. To this end, the operator takes a firm hold of the tamper with one hand, for example, while he pulls the pulling cable with the other hand. Since the throttle lever of the engine usually has to be set to full throttle for starting, the engine runs immediately at a high speed, which is often even above the operating speed. As a result, a centrifugal clutch coupling the engine to the tamping system is closed, as a result of which the tamping system is put into operation. The result of this is that the tamper performs pronounced tamping movements and can hardly be controlled by the operator, who at this moment is holding the tamper only with one hand. Operation is made even more difficult owing to the fact that a choke valve normally present at the carburetor is closed during starting, and this choke valve has to be opened again to end the starting operation. To this end, the operator must try to reach and actuate the choke lever, which is arranged at a different point from the pulling cable of the reversing starter.

An arrangement for controlling the speed of an internal combustion engine in an implement which can be guided at a handle is proposed in subsequently published DE 198 34 443, in which arrangement a detecting device has a sensor system on the handle, this sensor system being able to automatically detect whether the implement is being guided properly. If it is detected that the implement is not being guided properly, the detecting device merely enables the engine speed to be set to a safety speed below an operating speed of the internal combustion engine. In this case, the safety speed is below an engagement speed at which, for example, a centrifugal clutch of a tamper engages.

OBJECTS AND SUMMARY OF THE INVENTION

The basic idea described in DE 198 34 443 is to be further developed by the present invention. The object of the invention is therefore to specify a hand-guided implement in which dangerous working states due to uncontrolled engine speed increases are avoided and which permits easy operation.

The object is achieved according to the invention by hand-guided implements which are defined in the coordinated patent claims 1 and 2. Advantageous further developments of the invention can be gathered from the dependent claims.

In the first embodiment of the invention according to patent claim 1, a sensor device for detecting the hands of an operator and producing a corresponding handle signal is provided in a guide handle of the implement. Furthermore, a safety control is provided for evaluating the handle signal of the sensor device, detecting a starting operation of the engine and driving a speed-setting device, the speed setting being effected in accordance with the following rules: a speed increase is permitted only up to a safety speed below the operating speed when the engine is started. A speed increase is permitted up to the operating speed after a time interval detected by the safety control has expired, i.e. the previous speed limit is neutralized. The engine speed is immediately limited to the safety speed when the handle signal is absent, e.g. when the operator lets go of the guide handle.

The second embodiment of the invention as claimed in patent claim 2 is fundamentally based on the same principle as the first embodiment, although the sensor device at the guide handle has at least two sensor elements which are assigned in each case to a hand of the operator and which produce a sensor signal in each case when the associated hand is detected. In a safety control, the sensor signals are evaluated, a starting operation of the engine is detected and a speed-setting device of the engine is driven, the rules which are decisive for the driving being modified slightly compared with the first embodiment: a speed increase only up to the safety speed is likewise permitted when the engine is started. A speed increase beyond the safety speed is only possible when both sensor signals are present, that is to say when the operator holds the guide handle with both hands. The current speed is not influenced when only one sensor signal is present, i.e. the speed set previously is maintained. If the engine consequently still runs at safety speed, a speed increase to operating speed may only be effected if the operator holds the guide handle with both hands. Otherwise, the safety speed is maintained. However, if the engine is already at operating speed, the latter is also maintained even if the operator removes one hand from the guide handle and merely guides the implement with the other hand. The speed is limited to safety speed when both sensor signals are absent.

A common feature of both embodiments of the invention is that the holding of the guide handle by the hands of the operator is automatically detected without the operator himself having to become active, e.g. by actuating an additional safety or dead man's handle. He merely has to grasp the guide handle in the normal manner. The engine speed is influenced as a function of the automatically detected holding states without the operator having to actuate the throttle lever of the engine.

Pressure-sensitive, optical, capacitive or ultrasonic sensors are suitable as sensor elements.

In an especially advantageous further development of the invention, the engine can be cut out by the safety control if a predetermined time interval which can be detected by a cut-out timing element has expired. The cut-out timing element is triggered when both sensor signals are absent. In practice, this means that the implement cuts off itself if the operator does not have his hands on the guide handle during the predetermined time interval. Therefore the operator does not have to see to it that the implement cuts out, and unnecessary and environmentally harmful idling of the implement is avoided.

In a further advantageous refinement of the invention, the speed-setting device is an ignition device of the engine, this ignition device having at least two characteristic maps. In this case, a first characteristic map is provided for the normal operation of the engine, in which the engine speed corresponds to a position of a throttle lever. This also applies in the second characteristic map within a lower speed range, although the engine speed is limited to the safety speed. Exceeding the safety speed is ruled out. The safety control then drives the ignition device by changing over between the two characteristic maps.

BRIEF DESCRIPTION OF THE DRAWINGS

These and further advantages and features of the invention are explained in more detail below with reference to an example and with the aid of the attached figures. In the drawing.

Figure 1:
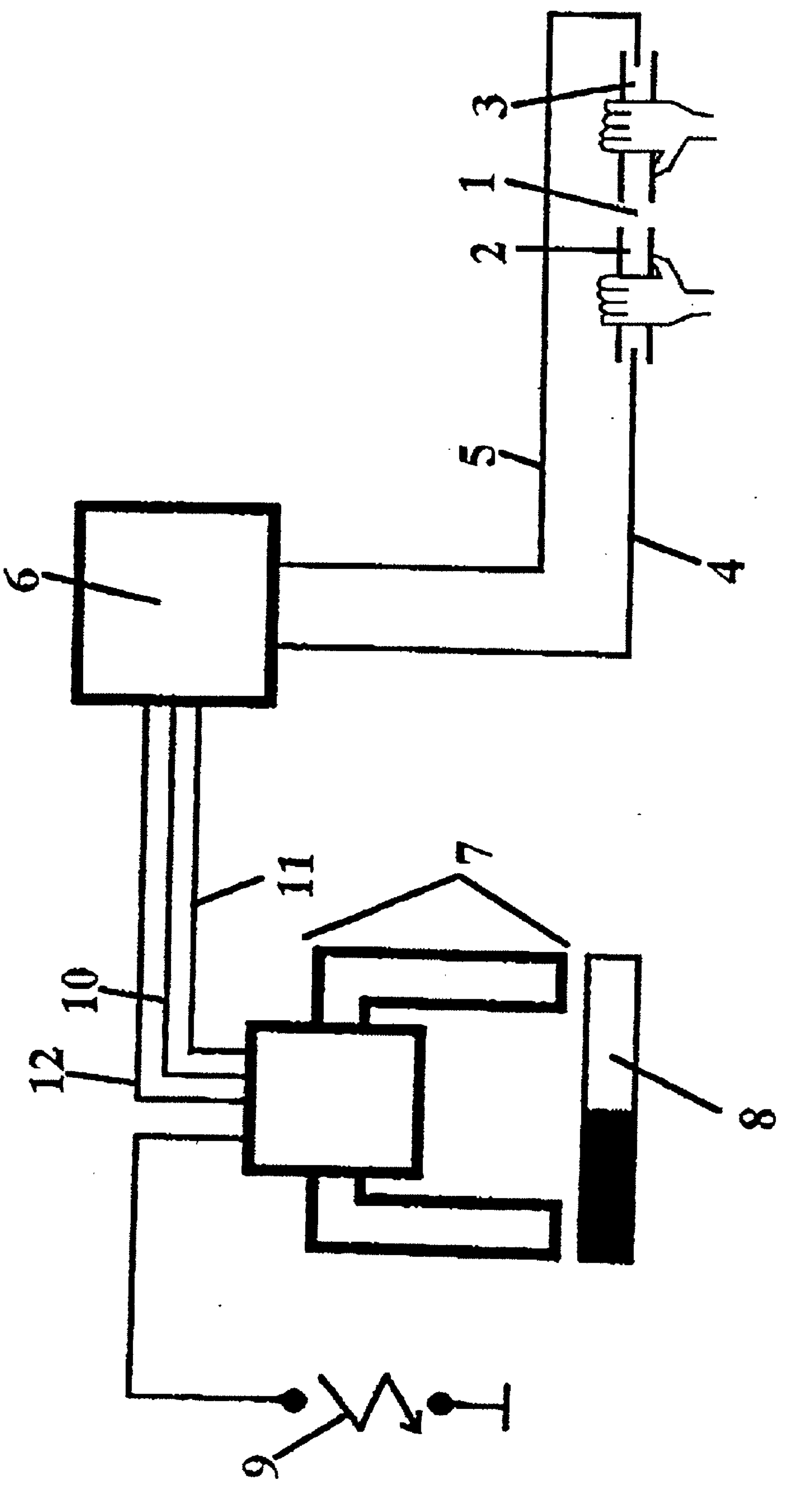
FIG. 1 schematically shows the construction of the circuit according to the invention in an implement according to the second embodiment of the invention.

The abovementioned first embodiment of the invention constitutes a technically simpler variant. It will be described later on by means of a comparison with the second embodiment. Therefore the second embodiment of the invention will be described first of all with reference to the schematic representation in FIG. 1, taking a vibratory tamper for soil compaction as an example.

DETAILED DESCRIPTION OF THE PREFERRED EMBODIMENTS

The tamper (not shown) is held and guided by the operator with both hands on a, for example stirrup-shaped, guide handle 1. The guide handle 1 is divided into a left handle region 2 for the left hand and a right handle region 3 for the right hand. Provided in the two handle regions 2, 3 is in each case at least one sensor element which detects the presence of the associated hand. Suitable sensor elements are in particular pressure-sensitive and optical sensors, capacitive or ultrasonic sensors also being possible. A pressure-sensitive sensor detects the hand of the operator when it at least rests on the guide handle 1. By a suitable arrangement, e.g. also of a plurality of sensors, it is possible to reliably detect a situation in which the hand not only rests on the guide handle 1 but also grasps it with some force and thus reliably holds it.

In contrast, optical sensors, e.g. photocells or other light-sensitive elements, may also be used in such a way that an approach of the hand of the operator is already detected. This may be more expedient for certain intended uses.

Each of the sensors produces a sensor signal which is directed via lines 4, 5 to a safety control 6.

Depending on the application or implement, more than two sensor elements may also be provided, if need be in more than two handle regions or zones of the guide handle 1. The number of sensor elements to be expediently used also depends on whether the sensor elements act more over an area (pressure-sensitive sensors) or in a spot-like manner (photocells).

The safety control 6 evaluates the sensor signals of the sensor elements. In addition, it is able to detect the starting operation of the engine. To this end, an additional sensor (not shown in FIG. 1) may be provided, this sensor detecting a speed increase of the engine from zero. Alternatively, an ignition device 7 of the engine can also be monitored, this ignition device 7 enabling the engine speed to be inferred on the basis of the ignition points. The provision of energy in the ignition device 7 is also an indication that the engine has been started.

The safety control 6 controls the ignition device 7, serving as speed-setting device, in accordance with predetermined rules, which are explained in more detail further below.

In the example described, the ignition device 7 is a generally known magneto high-tension capacitor ignition which is statically fastened to the engine housing and is excited by a two-pole magnet 8 integrally cast in the fan impeller (not shown) of the engine. From the energy obtained as a result and from the information on the cycle of the engine, the ignition device 7 determines the ignition point of the engine, which is filed in a characteristic map which establishes the optimum ignition angle for each load of the engine, and produces an ignition spark at a spark plug 9. If the optimum engine speed is exceeded, the ignition device 7 displaces the ignition point in accordance with the characteristic map, as a result of which a further speed increase does not occur. If the engine speed still increases further, e.g. on account of a decreasing load, the ignition device 7 additionally blanks out ignition impulses for retarded setting until the engine is again working within the desired speed range.

In the tamper according to the invention, a second control characteristic map is filed in addition to the normal ignition-angle characteristic map, this second control characteristic map being activated upon appropriate triggering by the safety control 6 via a control line 10 and limiting the engine to a speed below the operating speed by advancing the end of control. This speed limiting is effected independently of the position of a throttle lever, with which the operator can influence the speed in a conventional manner.

As already described in connection with the prior art, the vibratory tamper is usually equipped with a centrifugal clutch, which requires a certain engagement speed in order to engage it. The normal operating speed of typically 4500 rev/min for operating the tamper lies above the engagement speed, whereas an idling speed (e.g. 3000 rev/min) lies below the engagement speed. The idling speed is designated as safety speed, since no tamping movement possibly putting the operator or other persons at risk is effected, and the implement is thus at rest if the idling engine is ignored.

The energy produced in the ignition device 7 by the magnetic excitation is sufficient in order to also supply the safety control 6 with energy as soon as the engine is running. For this purpose, an energy line 11 is provided from the ignition device 7 to the safety control 6.

Whereas in the embodiment of the invention described the speed limiting by the safety control 6 is effected by changing over the characteristic maps filed in the ignition device 7, it is possible in a variant of the invention to carry out the speed limiting by means of a servo which is coupled to the throttle lever. In another variant of the invention, the position of the choke in the carburetor can be varied for influencing the speed.

The safety control 6 is able to cut out the ignition device 7 via a cut-off line 12, so that the engine stops immediately. This may be expedient, for example, when the safety control 6 detects for a prolonged period (e.g. 10 s) that no hand is resting on the guide handle 1.

Figure 2:
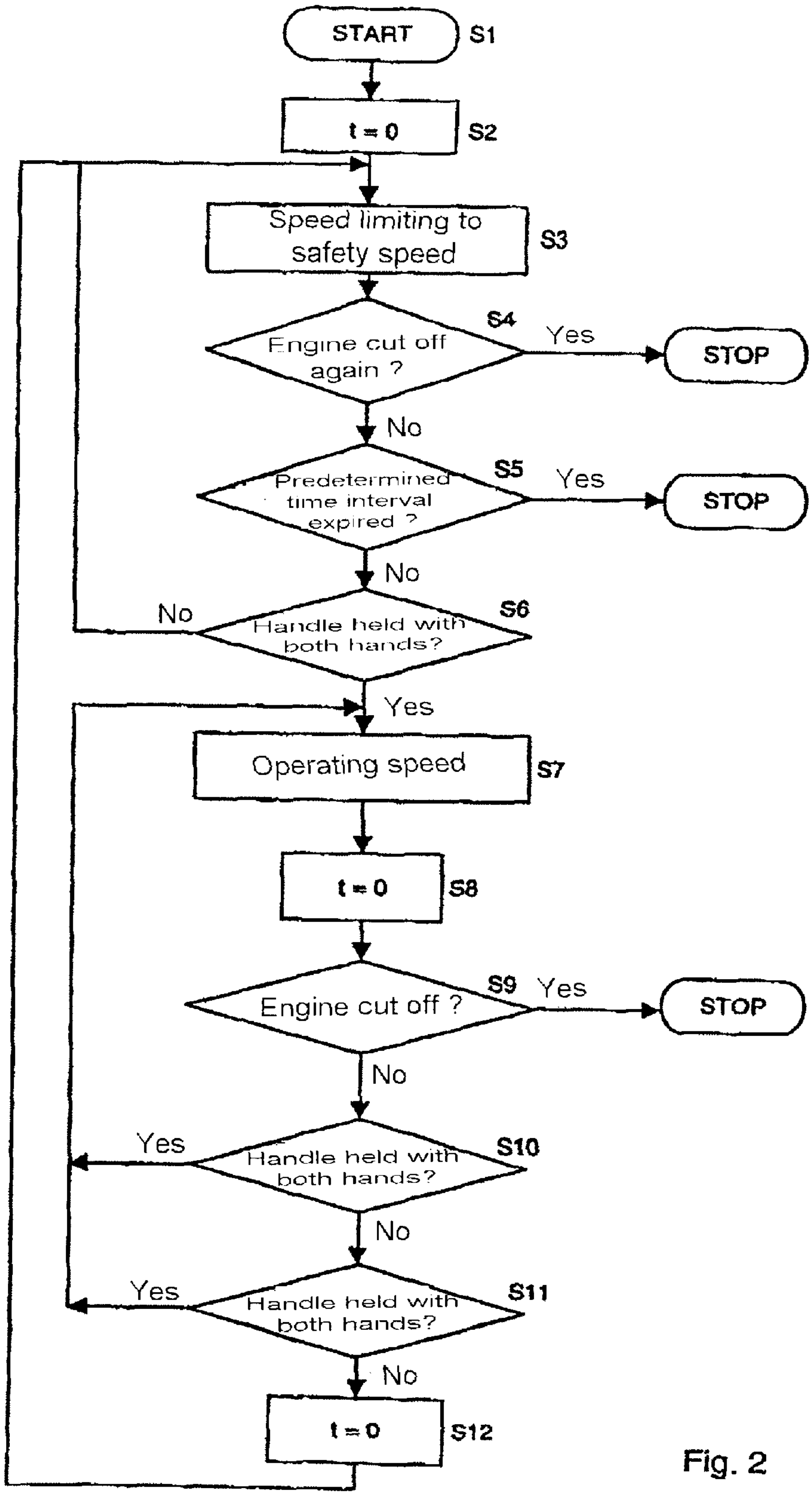
FIG. 2 shows a flow chart with the rules of the safety control for the second embodiment of the invention.

The functioning of the tamper and the rules for the speed control are described below with reference to the flow chart shown in FIG. 2.

During starting (step S1), the operator holds the tamper with one hand at the guide handle 1, while with the free hand he actuates a reversing starter (not shown in FIG. 1) until the tamper is running.

The safety control recognizes the starting operation at the instant t=0 (step S2) and changes over the ignition device to the second characteristic map with reduced speed (step S3), so that speed limiting to the safety speed is effected. Run-up of the engine and thus engagement of the centrifugal clutch are therefore prevented.

If it is discovered in step S4 that the engine has not started or has been cut off again, the program flow stops. If, on the other hand, the engine is running at safety speed, it is checked in step S5 whether a predetermined time interval (tmax) has expired. To this end, the time is recorded by a cut-out timing element triggered in step S2. If the predetermined time interval tmax is exceeded, the tamper is cut off.

Otherwise, in step S6, it is checked with reference to the sensor signals whether the guide handle 1 is grasped with both hands. If this is not the case, the engine remains at safety speed (step S3) and the checking of the expired time—without further operation at the guide handle 1 having been effected—takes place again in step S5.

When the two handle halves 2, 3 of the guide handle 1 are grasped, the safety control 6 changes over in step S6 to the standard characteristic map (step S7), so that the engine runs up to the operating speed predetermined by the throttle lever. As a result, the centrifugal clutch is closed and the tamping system works as desired by the operator. Since the operator is holding the tamper with both hands at this instant, safe guidance is ensured.

The cut-out timing element is triggered again in step S8, so that the time interval to be measured begins again.

An inquiry as to whether the tamper has been cut off is effected in step S9. In step S10, the sensor signals of the sensor elements are interrogated and evaluated, so that it can be determined whether the guide handle 1 is still held by both hands. If this is case, the program loop continues with step S7 with unaltered engine speed. The cut-out timing element is triggered again in step S8.

If no two-handed guidance is established in step S10, it is checked in step S11 whether guidance is single-handed if only one sensor signal is present. If this is the case, this has no effect on the engine speed (step S7). The cut-out timing element is then also triggered time and time again in step S8.

When both handle halves are let go of, that is to say when there is not even guidance with one hand, the program branches from step S11 to step S12, where the cut-out timing element is triggered again and after that a changeover to the second characteristic map is effected in step S3, as a result of which the engine speed drops by adjusting the ignition point and omitting the ignition impulses until the safety speed lying below the engagement speed of the centrifugal clutch is reached. An immediate interruption in the mechanical connection between drive engine shaft and tamping system is the result.

If the operator now grasps the guide handle 1 with only one hand, the engine speed does not change on account of the decision in step S6. The control characteristic map remains active on account of step S3, and the tamper waits with running engine, but without mechanical activity of the tamping system.

It is not until two-handed grasping of both handle halves 2, 3 is detected in step S6 that the tamper starts to work again immediately.

If, on the other hand, the tamper is not started up during the time interval tmax by grasping both handle halves 2, 3, the control device detects a work pause and automatically cuts off the tamper.

It is pointed out that, although the above embodiment has been described taking a gasoline engine as an example, the construction based on the invention and the associated rules may also be used in other engines such as diesel engines and electric motors.

In the first embodiment of the invention referred to above, only one sensor is provided for the entire guide handle 1, this sensor producing a sensor signal, serving as handle signal, when at least one hand touches or grasps the guide handle 1. A differentiation as to whether the operator is holding the handle with one hand or with both hands therefore does not take place in the first embodiment.

When the engine is started, a speed increase is permitted only up to the safety speed, as in the second embodiment. At the same time, a timing element is triggered. After a time interval (e.g. 5 s) predetermined by the timing element has expired and the handle signal is present, the safety control permits a speed increase beyond the safety speed. If the handle signal is no longer present, the engine speed is immediately limited again to the safety speed. Running-up of the engine is therefore only possible if at least one hand is resting on the guide handle 1.

Even if the first embodiment of the invention therefore does not have the same convenient functionality as the second embodiment, the features relevant to safety are realized.

The invention can be very advantageously used not only in the vibratory tamper described but also in other engine-operated implements, such as vibratory plates, vibratory rollers, hammers and power saws.

What is claimed is:

1. A hand-guided implement comprising:

an engine;

a speed-setting device for the engine for setting at least one operating speed and a safety speed below the operating speed;

at least one guide handle with a sensor device for detecting the hands of an operator on the guide handle and producing a corresponding handle signal; and a safety control for evaluating the handle signal of the sensor device, detecting a starting operation of the engine and driving the speed-setting device in accordance with the following rules:

speed increase only up to the safety speed and triggering of a timing element when the engine is started;

permitting a speed increase beyond the safety speed when a time interval predetermined by the timing element has expired since the starting of the engine and the handle signal is present; and limiting the speed to the safety speed when the handle signal is absent.

2. A hand-guided implement comprising:

an engine;

a speed-setting device for the engine for setting at least one operating speed and a safety speed below the operating speed;

at least one guide handle with a sensor device for detecting the hands of an operator on the guide handle;

the sensor device having at least two sensor elements which can be assigned in each case to a hand of the operator at the guide handle and which accordingly produce a sensor signal in each case when the hand is detected;

the sensor signals being directed to a safety control, and the safety control being designed for evaluating the sensor signals of the sensor elements, detecting a starting operation of the engine and driving a speed-setting device in accordance with the following rules:

speed increase only up to the safety speed when the engine is started;

permitting a speed increase beyond the safety speed when both sensor signals are present;

no influencing of the current speed when only one sensor signal is present; and limiting the speed to the safety speed when both sensor signals are absent.

3. The implement as claimed in claim 2, wherein one of the sensor elements is arranged in a left handle region of the guide handle for the left hand of the operator and the other sensor element is arranged in a right handle region for the right hand.

4. The implement as claimed in claim 1, wherein the sensor device has at least one pressure-sensitive, optical, capacitive or ultrasonic sensor.

5. The implement as claimed in claim 1, wherein the engine can be cut out by the safety control;

a cut-out timing element belonging to the safety control can be triggered when both sensor signals are absent; and the safety control cuts out the engine when a predetermined time interval which can be detected by the cut-out timing element has expired.

6. The implement as claimed in claim 1, wherein the speed-setting device is an ignition device of the engine.

7. The implement as claimed in claim 6, wherein the ignition device has at least two characteristic maps, namely a first characteristic map, according to which the engine speed corresponds to a position of a throttle lever, and a second characteristic map, according to which the engine speed corresponds to a position of the throttle lever but is limited to the safety speed, and in that the safety control drives the ignition device by changing over between the two characteristic maps.

8. The implement as claimed in claim 6, wherein the ignition device in each case has a characteristic map for the operating speed and for the safety speed.

9. The implement as claimed in claim 1, wherein the safety control is supplied with energy from the speed-setting device.

10. The implement as claimed in claim 1, wherein a further sensor is provided for determining the starting operation of the engine.

* * * * *